United States Patent [19]

Kojima et al.

[11] 4,293,260
[45] Oct. 6, 1981

[54] SCREW GROMMET

[75] Inventors: Masaharu Kojima; Seiji Mitomi, both of Toyota, Japan

[73] Assignee: Nifco Inc., Yokohama, Japan

[21] Appl. No.: 93,783

[22] Filed: Nov. 13, 1979

[30] Foreign Application Priority Data

Nov. 21, 1978 [JP] Japan .................. 53-142795

[51] Int. Cl.³ ............................................. F16B 13/06
[52] U.S. Cl. ........................................ 411/44; 411/111
[58] Field of Search ................................ 85/80, 81, 5 R; 24/73 P, 73 PF, 73 PM; 151/41.75; 411/44, 427, 366

[56] References Cited

U.S. PATENT DOCUMENTS

| 3,352,195 | 11/1967 | Fisher | 85/80 |
| 3,358,551 | 12/1967 | Seckerson | 24/73 PF X |
| 4,077,300 | 3/1978 | Yoda | 85/80 |
| 4,082,030 | 4/1978 | Erickson | 85/80 |

FOREIGN PATENT DOCUMENTS 1408137  6/1965  France ..................... 85/81

*Primary Examiner*—Ramon S. Britts
*Attorney, Agent, or Firm*—J. R. Halvorsen; T. W. Buckman

[57] ABSTRACT

In a screw grommet of the type composed of a head portion, a barrel portion extended downwardly from the head portion, and a continuous axial cavity through the head portion and the barrel portion and possessed of an inside diameter smaller than the diameter of screw means destined to be driven into the cavity, the barrel portion is provided thereon with angular portions which are adapted to match to the corners in a polygonal fitting hole punched in a panel for insertion of the grommet and are connected through the medium of hinges to the remaining part of the barrel portion. In the screw grommet, the force generated by the screw means being driven into the axial cavity inside the barrel portion causes the angular portions of the barrel portion to be outwardly expanded and pressed against the corners of the fitting hole without being rotated with the screw means, enabling the grommet to be secured strongly to the panel.

5 Claims, 9 Drawing Figures

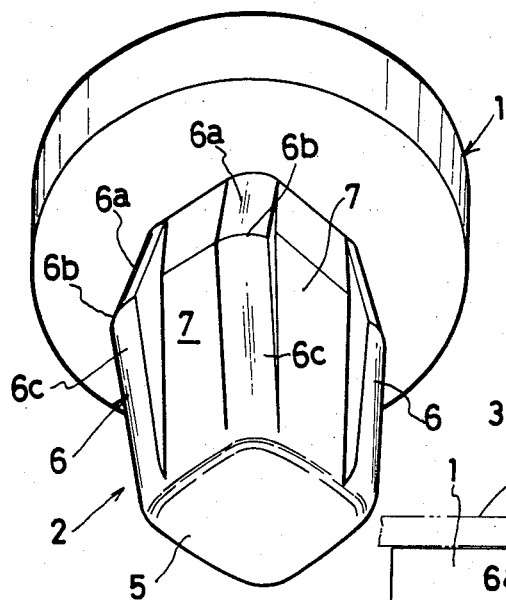
Fig_1
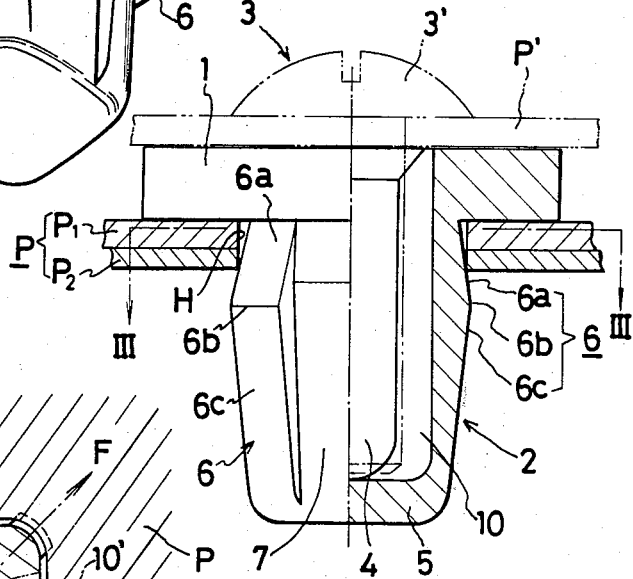
Fig_2
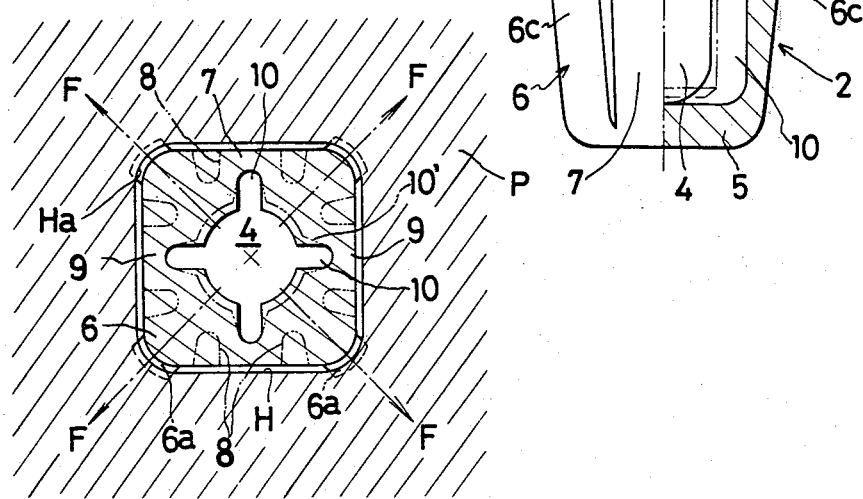
Fig_3

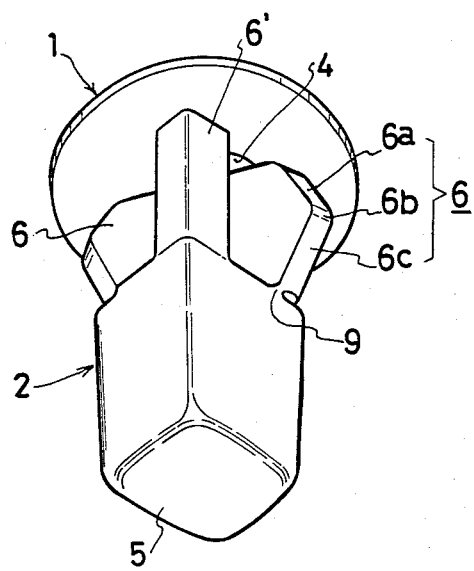
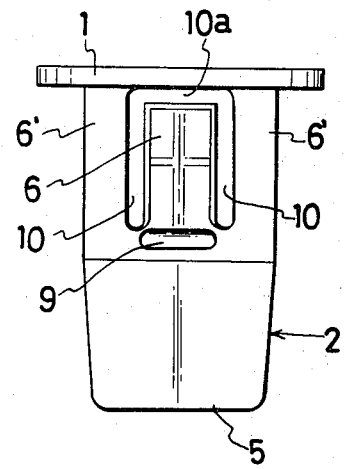
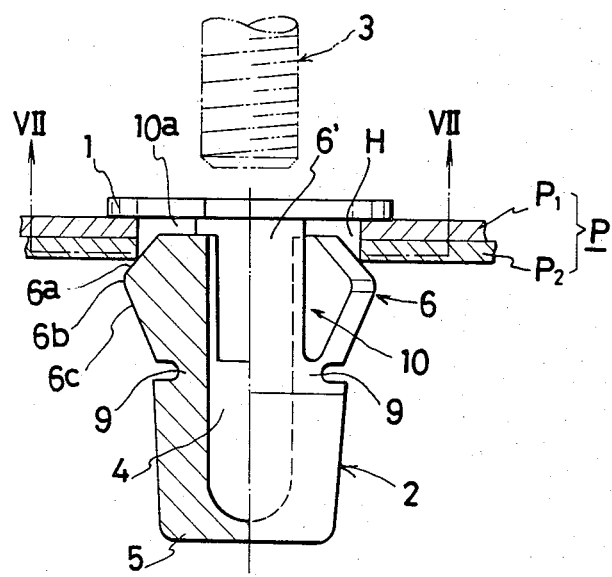

SCREW GROMMET

BACKGROUND OF THE INVENTION

This invention relates to a screw grommet.

A screw grommet of the type which comprises a head portion, a barrel portion extended downwardly from the head portion and adapted to be inserted through a fitting hole punched in advance in a panel, and a continuous axial cavity through the head portion and the barrel portion, whereby a screw driven into the axial cavity causes at least a part of the enclosing shell of the barrel portion to be outwardly expanded and pressed against the edge of the fitting hole, enabling the screw grommet to be fixed onto the panel has extensive utility as means for fixation of various parts. Although this screw grommet is usable in various ways, it is generally employed for the purpose of uniting a plurality of panel members or fixing one panel member on the barrel portion and, at the same time, securing another panel member in position by the squeezing force generated between the head of the screw and the head portion of the screw grommet.

It is a requirement of screw grommets of the type described above that the grommet should not rotate together with the screw while the screw is being driven into the axial cavity. If the grommet should rotate with the screw, the screw will not be able to enter the cavity and discharge its function. Consequently, the grommet which has been inserted into the fitting hole in the panel cannot be fastened to the panel.

For preventing such rotation of the grommet with the screw as described above, it has heretofore been suggested to cut key grooves in the edge of the fitting hole punched in the panel member for insertion of the barrel portion of the grommet and to raise corresponding ridges or keys from the outer surface of the barrel portion for thereby accomplishing desired union of the grommet and the panel through engagement of the key grooves with the ridges or keys. This measure, however, proves uneconomical because the punching of the fitting hole necessitates use of a punch of special shape or calls for a two-step operation of first punching a fitting hole and subsequently cutting key grooves in the edge of the fitting hole. Other arrangements intended to give better economy than that described above (such as disclosed in U.S. Pat. Nos. 3,869,958, 3,933,076 and 4,070,945, for example) are based on the principle of preventing the undesired rotation by forming the fitting hole in the shape of a rectangle and producing the barrel portion of the grommet to have a section of matching rectangular shape so that the corners of the matched rectangles keep the grommet from being rotated around its axis.

The aforementioned arrangements which make use of matching rectangels indeed prove to be simpler than any other method. Heretofore, however, the barrel portion of the grommet has been produced with a rectangular section and inserted into the fitting hole punched in a matching rectangular shape solely for the purpose of preventing the undesired rotation and idea that the corners of the matched rectangles ought to be utilized for the additional purpose of enhancing the force with which the grommet is fastened to the panel has never occurred to any person skilled in the art.

Specifically, the barrel portion of the grommet which is caused to expand outwardly by the screw being driven into the axial cavity has been intended strictly for the purpose of establishing thorough contact between the outer wall surface thereof and the edge of the rectangular fitting hole. It was thought that the required engagement of the barrel portion with the edge of a fitting hole possessing definite dimensions of its own would best be obtained by outwardly expanding the barrel portion and consequently pressing it against the edge.

When a rectangular fitting hole is to be formed in a panel, however, it is not possible to punch the corners of the hole perfectly at right angles. Conversely, with the punching machine generally adopted for cutting holes in panels, it has become common practice to cut away the four corners of a rectangular die used for punching rectangular holes for the purpose of lengthening the service life of the punching machine in use. Thus the corners of the fitting hole are inevitably rounded to some extent so that the grommet and the fitting hole are not allowed to come into perfect engagement with each other at their corners. Consequently, there is a possibility that the rotary force generated in the grommet while the screw is driven into the axial cavity of the barrel portion of the grommet will build up to the extent of causing the barrel portion to slip on and rotate inside the edge of the rectangular hole of the panel.

The main object of this invention is to provide a screw grommet which can be secured in the fitting hole of a substantially rectangular shape in a panel so fast that the barrel portion thereof held inside the fitting hole will not be rotated with the screw.

SUMMARY OF THE INVENTION

To accomplish the object described above according to the present invention, there is provided an improvement in and concerning a screw grommet of the type composed of a head portion, a barrel portion extended downwardly from the aforementioned head portion and a continuous axial cavity through the head portion and the barrel portion and possessed of a diameter smaller than the diameter of screw means to be inserted in the cavity, which improvement comprises at least one angular portion provided on the barrel portion so as to match to at least one of the corners of a polygonal fitting hole in a panel for insertion of the grommet, which angular portion is connected through the medium of a hinge to the remaining part of the barrel portion and is adapted to be outwardly expanded by the screw means being driven into the axial cavity enclosed by the barrel portion.

In the screw grommet according to this invention, the angular portion provided on the barrel portion thereof is positively expanded outwardly by the insertion of the screw as described above. Even when the corners of the fitting hole punched in the panel for insertion of the grommet are rounded for the aforementioned reason, therefore, the angular portion which is outwardly expanded by the insertion of the screw means satisfactorily serves its purpose of preventing the barrel portion of the grommet from being rotated inside the fitting hole with the screw. The fastness with which the grommet is secured to the panel is enhanced in proportion as the resistance against which the screw means is driven into the axial cavity increases and, consequently, the pressure with which the angular portion is pushed against the corresponding corner in the fitting hole increases.

The other objects and characteristics of the present invention will become apparent from the further disclosure of the invention to be given hereinafter with reference to the accompanying drawing.

BRIEF EXPLANATION OF THE DRAWING

FIG. 1 is a perspective view of the first embodiment of the screw grommet according to the present invention.

FIG. 2 is a half-sectioned side view of the screw grommet of FIG. 1.

FIG. 3 is a sectioned view of the grommet as taken along the line III—III in FIG. 2.

FIG. 4 is a perspective view of the second embodiment of the screw grommet according to this invention.

FIG. 5 is a side view of the screw grommet of FIG. 4.

FIG. 6 is a half-sectioned side view of the screw grommet of FIG. 4.

DESCRIPTION OF THE PREFERRED EMBODIMENT

Figure 7:
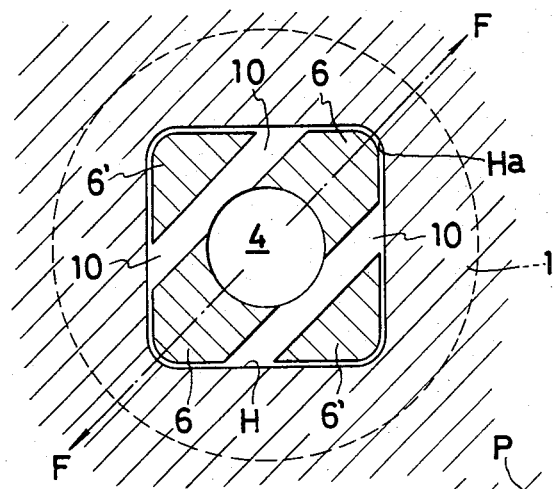
FIG. 7 is a sectioned view of the screw grommet as taken along the line VII—VII in FIG. 6.

Similarly to an ordinary screw grommet, the first embodiment of the screw grommet according to this invention which is illustrated in FIGS. 1 to 3 comprises a head portion 1 and a barrel portion 2 extended downwardly from the head portion 1 and is integrally molded of a plastic substance. Continuously through the head portion 1 and the barrel portion 2, there is provided an axial cavity 4 of a diameter large enough to permit forced insertion of screw means 3 such as a tapping screw (indicated by a chain line). This cavity 4 is illustrated in the half-sectioned side view of FIG. 2. The cavity 4 may be extended through the leading end 5 of the barrel portion. In the present embodiment, the axial cavity is produced in a blind form with a view to providing sufficient overall strength for the grommet.

Although the screw grommet of the present invention is intended for use in fitting holes of substantially polygonal shapes, the present embodiment illustrates the screw grommet designed specifically for use in a square fitting hole. The barrel portion 2 of this grommet, therefore, has a square section (FIG. 3).

In the side view of the outer shape of the barrel portion in the screw grommet of the first embodiment, it is seen that four angular portions 6 gradually slant outwardly as they extend axially downward from their bases on the lower surface of the head portion 1 each to form an upwardly tapered surface 6a and, upon reaching their most expanded parts 6b, begin to slant inwardly in the direction of their continued downward extension to each form a downwardly tapered surface 6c.

Because of the specific construction of the four angular portions 6 described above, the screw grommet of this embodiment can be temporarily attached to, i.e., held fast in position in, the fitting hole "H" bored in the panel until it is finally secured to the panel by the insertion of the screw 3 into the axial cavity, on condition that the aforementioned fitting hole "H" punched in the panel has a size greater than the area demarcated by a continuous line drawn on the outer boundaries of the bases of the angular portions 6 on the head portion 1 and smaller than the area demarcated by a continuous line drawn on the outer boundaries at the greatest heights 6b of the angular portions 6.

To be more specific, as the grommet is inserted in the direction of the leading end 5 of its barrel portion into the fitting hole "H" of the size mentioned above, the neighborhood of the grommet near the most expanded parts 6b of the angular portions get stuck against the edge of the fitting hole. When the grommet is pushed down with added force, the barrel portion is bent inwardly by the edge of the hole because of the elasticity of the plastic material coupled with the axial cavity therein, enabling the most expanded parts 6b of the angular portions to ride past the side walls of the fitting hole. After the most expanded parts 6b of the angular portions 6 have completely passed from the opposite side of the edge of the fitting hole, they are allowed to resume their original shape by virtue of the elasticity of the plastic material used. Consequently, the upwardly tapered surface 6a of the angular portions assume a position inside the hole H and come into gentle contact with the inner walls of the hole or directly confront the lower edge of the hole. The temporary attachment of the grommet proper is accomplished as illustrated in FIG. 2, facilitating the subsequent work of insertion of the screw means 3.

In the case of the illustrated embodiment, the boundary surfaces 7 of the barrel portion 2 which correspond to the boundary sides of the fitting hole continue to extend in a flat state from their bases on the head portion 1 to the leading end 5 while slightly tapering toward the leading end. The slight tapering thus involved is aimed at alleviating, though very slightly, the increase in the force needed in bending inwardly the most expanded parts 6b of the angular portions and, at the same time, economizing the plastic material used for the production of the grommet. In the absence of such necessity, the boundary surfaces 7 may be formed in the same tapered construction as the angular portions 6.

Conversely, a desire to decrease the force needed in the insertion of the grommet and consequently improve the working efficiency of the grommet can be fulfilled by cutting grooves 8 in the axial direction to a fairly great depth below the boundary surfaces 7 as indicated by the chain lines in FIG. 3.

Where temporary attachment of the grommet is not required as when the grommet is brought into its finally secured state by insertion of the screw means 3 in the axial cavity immediately after the insertion of the grommet proper in the fitting hole "H", no use is found for the tapered construction including the aforementioned most expanded part. In this case, the angular portions may be extended in a continuously flat form throughout the entire length. Otherwise, if it is felt that at least the initial insertion thereof into the fitting hole ought to be facilitated, they may be tapered slightly toward the leading end 5 of the barrel portion.

A dominant characteristic of the screw grommet of this invention consists in the fact that at least one of the angular portions 6 of the barrel portion which correspond to the corners Ha of the square fitting hole, namely each angular portion 6 in the present embodiment, is adapted so that it will be outwardly expanded when the screw means 3 is driven into the axial cavity.

As is amply apparent from FIG. 3 which represents a sectioned view of the screw grommet as inserted into the fitting hole H, the angular portions 6 in the present embodiment are supported in position by the hinges 9 formed by decreasing the wall thickness of the barrel portion 2. In the case of the illustrated embodiment, these hinges 9 of a decreased wall thickness are formed by providing slits 10 one each longitudinally in the axial direction of the grommet and vertically to a suitable depth toward the corresponding boundary surfaces 7 from the circumferential edge of the axial cavity 4 used for the insertion of the screw means 3. The angular portions 6 are provided with two such hinges one on each side thereof so that, under the force "F" applied outwardly from the inside of the axial cavity 4, they are directly expanded in fixed directions (indicated by the arrow "F" in FIG. 3), namely in the directions of the corners Ha of the fitting hole. Thus, the desired construction of the grommet described above is obtained.

As the screw means 3 is driven into the axial cavity of the grommet which is temporarily attached to the panel as shown in FIG. 2, it taps the inner wall of the axial cavity and, at the same time, tends to push the inner wall surface of the cavity outwardly. The force "F" thus exerted upon the inner wall surface is conveyed via the hinges to the angular portions 6. Consequently, the angular portions 6 are outwardly expanded and pushed away with increasing pressure toward the corresponding corners Ha of the fitting hole H while the slits 10 are allowed to expand as indicated by the chain line 10'.

In this manner, the screw grommet is secured onto the panel "P". Since the angular portions of the barrel portion are adapted positively to be forced into tight contact with the corresponding corners Ha of the fitting hole as described above, the force to be cooperatively produced by the angles of the fitting hole and the angular portions of the barrel portion which are intended to prevent the grommet from being rotated with the screw means 3 being driven into the axial cavity immediately serves the purpose of keeping the grommet and the fitting hole in intimate engagement. The screw grommet of this invention, therefore, is capable of producing ample force for the mutual engagement between the grommet and the panel as well as for the function of preventing the grommet from the rotation. The present invention, accordingly, offers a perfect solution of the problem of the torque of the screw means being driven to a greater depth in an effort to enhance the force of mutual engagement as in the conventional screw grommet building up to overcome the force which is generated for the prevention of rotation through the mutual engagement of the angles of the grommet and those of the fitting hole.

The uses found for the screw grommet of this invention are similar to those for the conventional screw grommet. For example, where the given panel "P" consists of two panel members $P_1$, $P_2$ as illustrated in FIG. 2, the screw grommet can be used for fixing these two panels $P_1$, $P_2$ as pressed against each other face to face. Otherwise, it can be used for holding, at a distance from the panel "P", another panel P' in position by the squeezing force generated between the head portion 1 of the grommet and the head of the screw 3'.

As described above, the screw grommet according to this invention represents an improvement in and concerning the screw grommet of the type composed of a head portion, a barrel portion extended downwardly from the aforementioned head portion and an axial cavity formed continuously through the head portion and the barrel portion and possessed of a diameter capable of admitting forced insertion of screw means, which improvement comprises at least one angular portion provided on the barrel portion so as to match to at least one of the corners of a polygonal fitting hole, the angular portion being supported through the medium of a hinge on the remaining part of the barrel portion.

Although, in the embodiment described above, the barrel portion of the screw grommet has been illustrated as possessing a square section, it may possess any other polygonal section such as, for example, a rectangular, pentagonal or hexagonal section. Depending on the force of engagement required in the particular use, the screw grommet may be produced in a construction such that only one or two of the plurality of angular portions are adapted to be outwardly expanded through the medium of hinges.

Further, a construction wherein slits are inserted in three of the four sides of each angular portion 6 and the remaining side is utilized as a hinge for that angular portion may be conceived from the aforementioned spirit of the present invention. A typical example of this construction is illustrated in FIGS. 4 to 7. The components of the construction which are identical or similar to those of the first embodiment are denoted by like symbols.

The screw grommet of this embodiment comprises a head portion 1, a barrel portion 2 extended downwardly from the head portion, and an axial cavity 4 of a diameter smaller than the diameter of screw means 3 provided continuously through the head portion and the barrel portion.

The barrel portion, in this embodiment, is provided with two angular portions which are disposed diagonally to each other and adapted for forced contact with the corners in the rectangular fitting hole "H".

Again in this embodiment, for the purpose of permitting temporary attachment of the screw grommet to the panel "P", the surface of each angular portion for forced contact is formed in a tapered construction containing an upwardly tapered surface 6a, a most expanded part 6b, and a downwardly tapered surface 6c so as to fulfill the same function as in the first embodiment.

In order for the angular portions 6 of the aforementioned construction to be outwardly expanded by the insertion of the screw means 3, the present embodiment causes slits 10 to be cut one each in the opposite vertical sides of each angular portion 6, another slit 10a to be cut in the upper side of each angular portion 6 and a dent to be inserted in the circumferential direction in the outer surface of each angular portion at the bottom of the downwardly tapered surface 6c to give rise to a hinge 9. Unlike the first embodiment wherein the angular portions are expanded by an increase in the diameter thereof, the present embodiment causes the angular portions to be expanded outwardly by being turned in the downward and outward directions with the hinges 9 serving as the fulcrums. The length and wall thickness of the leading end portion 5 of the barrel portion below the hinges may suitably be fixed in due consideration of the strength and other factors which the screw grommet is required to satisfy.

In the screw grommet of the construction described above, the screw 3 (indicated by a chain line in FIG. 6) forcibly driven into the axial cavity 4 in the grommet exerts a force which tends to push the angular portions 6 of the barrel portion outwardly in the direction indicated by the arrow "F". Consequently, the angular portions 6 opposed to the corners Ha in the rectangular fitting hole H are pressed against the aforementioned angles Ha, enabling the grommet to fasten the panel "P" in position or to join two panel $P_1$, $P_2$ to each other tightly face to face. The force of engagement produced between the angular portions of the barrel portion and the corresponding corners of the fitting hole and utilized for preventing the grommet from being interdependently rotated with the screw increases in proportion as the pressure exerted by the angular portions upon the corners increases.

Although, in this particular embodiment, the hinges 9 are disposed below the bottoms of the downwardly tapered surfaces of the respective angular portions, they may be formed between the angular portions 6 and the head portion 1, with the horizontal slits cut in the lower sides of the angular portions instead to give rise to free ends of the angular portions at their bottoms. Consequently, the angular portions can be expanded outwardly by being turned in the upward and outward directions with the hinges 9 as the fulcrums. If, in the construction now under discussion, the portion intervening between the head portion 1 and the bases of the hinges is regarded as constituting a barrel portion, then the higher concept of the construction of this invention dealt with above applies without any modification to the present construction.

Figure 8:
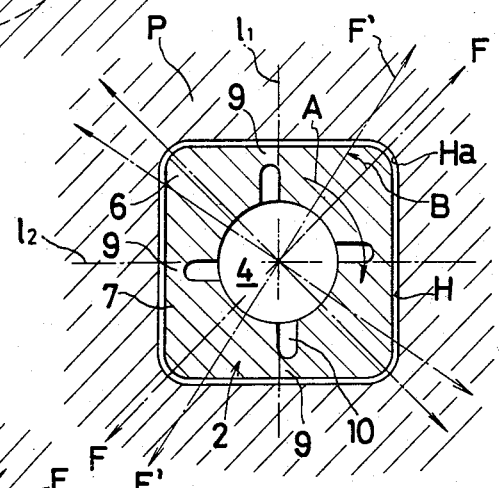
FIG. 8 is a sectioned view of the third embodiment of the screw grommet according to this invention.

The embodiment illustrated in FIG. 8 is a modified version of the first embodiment illustrated in FIGS. 1 to 3. In the first embodiment, the slits 10 and their respective hinges 9 are positioned to fall on the lines $l_1$ and $l_2$ which pass the central points of the sides of the barrel portion and, consequently, the angular portions 6 are allowed to expand outwardly in the directions "F" equalling the diagonal directions "F" of the fitting hole "H" (directions including the apexes of the corner angles) as illustrated in the diagram. In contrast, in the modified version, the angular portions are allowed to expand in the directions F' which differs slightly from the aforementioned directions F of the apexes.

This modification is based on the principle that when the force arising from the forced insertion of the screw means into the axial cavity tends to cause rotation of the barrel portion in the direction of the arrow A, the resistance required in overcoming this force is obtained more advantageously by causing the angular portions 6 to be expanded in the radial directions F' which deviate from the diagonal lines "F" in the direction "B" opposite the direction "A" in which the rotation tends to occur, rather than by causing the angular portions to exert the force of engagement in the diagonal directions. In this modification, the angular portions which are disposed behind the diagonal corners with reference to the direction of the rotation are allowed to be expanded more than any other part of the barrel portion. Even if the torque which issues from the insertion of the screw means and urges the barrel portion to rotate builds up substantially to the extent of forcing the diagonal corners out of engagement with the corresponding corners of the fitting hole, the expansion of the angular portions is great enough to preclude possible occurrence of rotation of the barrel portion.

This modified construction can be obtained by causing the hinges 9 and the slits 10 to deviate by a desired degree from their respective positions shown in FIGS. 1 to 3 in the direction opposite the direction of the interdependent rotation.

Figure 9:
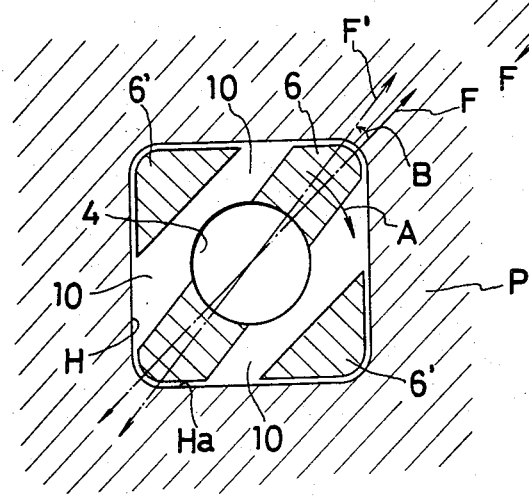
FIG. 9 is a sectioned view of the fourth embodiment of the screw grommet according to the present invention.

FIG. 9 illustrates a modification of the second embodiment. In this modification, the positions of the angular portions 6 and the slits 10 deviate in the direction B opposite the direction A of the rotation so that the angular portions are allowed to be expanded in the directions F' which deviate in the direction "B" from the diagonal directions "F".

As described in detail above, the present invention causes the angular portions of the barrel portion to be positively pressed against the corresponding corners in the polygonal fitting hole. This fact immediately implies that an addition to the force of engagement between the matched angles results in a proportional increase in the force to resist the interdependent rotation of the barrel portion. Thus, the present invention brings about a conspicuous effect of providing screw grommets with an outstanding function.

In each of the embodiments cited above, the hinges 9 have been illustrated as parts possessing a wall thickness smaller than in the neighboring parts to emphasize contrast. Where the repulsive force generated by the screw driven in the axial cavity, the difference between the diameter of the screw and that of the axial cavity 4, the material of which the grommet is made, and other factors warrant that the angular portions have an ample capacity for expansion, there is no particular need for forming the hinges with a decreased wall thickness.

What is claimed is:

1. An improvement in a screw grommet adapted to accept a screw of a predetermined diameter and to be inserted in a polygonal hole of the type including a head portion, a barrel portion extended downwardly from the head portion having an external cross-section substantially matching said polygonal hole, and a continuous axial bore through the head portion and a substantial portion of the barrel portion and possessed of an inside diameter smaller than the diameter of said screw, external means provided on the barrel portion so as to match to at least one of the corners of said polygonal fitting hole punched in a given panel for acceptance of the grommet, said external means defining a flexible portion extending angularly relative to adjacent sides of said barrel portion and further extending outwardly beyond the margin of the said at least one corner defined by said adjacent sides of the hole, said barrel portion including relief means extending outwardly from said axial bore toward the sides of said barrel portion substantially mating with said hole but not angularly toward the said at least one corner, said angular corner engaging portion thereby being connected through the medium of a hinge formed by said relief means to the remaining part of the barrel portion and adapted to be outwardly expanded into the said at least one corner by the screw means being driven into the axial cavity enclosed with the barrel portion.

2. The screw grommet according to claim 1, wherein the hinge is provided at a position such that the angular portion of the barrel portion is allowed to be expanded outwardly in a radial direction which deviates from the direction including the apex of the corresponding corner in the fitting hole in a direction opposite the direction in which the screw means is driven into the axial cavity.

3. The screw grommet according to claim 1 wherein said relief means extend radially outwardly from said bore.

4. The screw grommet according to claim 2 wherein said relief means extend substantially offset from the radial lines that traverse the axis of said bore and are perpendicular to said sides.

5. The screw grommet according to claim 1 wherein said relief means open through said side walls of the barrel and are generally tangential to said bore.

* * * * *